United States Patent
Brueck et al.

(10) Patent No.: US 7,660,279 B2
(45) Date of Patent: Feb. 9, 2010

(54) METHOD OF SCHEDULING UPLINK RESOURCE IN A WIRELESS COMMUNICATION SYSTEM

(75) Inventors: Stefan Brueck, Nuremberg (DE); Roland Johannes Guethaus, Schwaig (DE); Enrico Jugl, Nuremberg (DE); Thomas Kleinhenz, Nuremberg (DE); Jens Mueckenheim, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 408 days.

(21) Appl. No.: 11/340,613

(22) Filed: Jan. 27, 2006

(65) Prior Publication Data

US 2007/0177536 A1   Aug. 2, 2007

(51) Int. Cl.
*H04W 4/00* (2006.01)
*H04W 72/00* (2006.01)
*H04L 12/28* (2006.01)
*H04L 12/56* (2006.01)

(52) U.S. Cl. .............. 370/328; 370/329; 370/331; 370/395.4; 370/252; 455/452.2

(58) Field of Classification Search ............... 370/328, 370/329, 331, 395.4, 252; 455/452.2
See application file for complete search history.

(56) References Cited

U.S. PATENT DOCUMENTS

| | | | | |
|---|---|---|---|---|
| 2002/0181436 A1* | 12/2002 | Mueckenheim et al. | ...... | 370/349 |
| 2005/0163056 A1* | 7/2005 | Ranta-Aho et al. | ......... | 370/252 |
| 2005/0220116 A1* | 10/2005 | Ahn et al. | ............... | 370/395.4 |
| 2005/0282549 A1* | 12/2005 | Kim et al. | .................. | 455/436 |
| 2006/0018282 A1* | 1/2006 | Kwak et al. | ................. | 370/331 |
| 2006/0104242 A1* | 5/2006 | Kim et al. | .................. | 370/329 |
| 2006/0114877 A1* | 6/2006 | Heo et al. | ................... | 370/342 |
| 2007/0002750 A1* | 1/2007 | Sang et al. | .................. | 370/238 |

OTHER PUBLICATIONS

3GPP TS 25.309 v6.5.0 (Dec. 2005).

* cited by examiner

*Primary Examiner*—Vincent P Harper
*Assistant Examiner*—Ariel Balaoing
(74) *Attorney, Agent, or Firm*—Harness, Dickey & Pierce

(57) ABSTRACT

In one embodiment, a target scheduling grant for a user is generated based on the uplink resource consumed by a plurality of users, and a scheduling grant for a user is generated based on the target scheduling grant and the uplink resource consumed by the user. More specifically, in one embodiment, a scheduling grant is generated for the user based on the target scheduling grant, the uplink resource consumed by the user, and a reference scheduling grant.

19 Claims, 4 Drawing Sheets

METHOD OF SCHEDULING UPLINK RESOURCE IN A WIRELESS COMMUNICATION SYSTEM

BACKGROUND OF THE INVENTION

FIG. 1 illustrates a portion of a UMTS wireless communication network. As shown, user equipment (UE) wirelessly communicates with a Node-B serving the communication needs of a geographic area (often referred to as a cell or collection of cells). The UE may be a mobile phone, wireless equipped PDA, wireless equipped laptop, etc. The UE may also be referred to as a mobile station or mobile unit, and the Node-B is often referred to as a base station. Communication from a Node-B to a UE is referred to as downlink or forward link communication, and communication from a UE to a Node-B is referred to as uplink or reverse link communication. In the uplink, various communication channels may exist.

Node-Bs communicate with a radio network controller (RNC), which may configure the UE and the Node-B for communication over enhanced dedicated channels (EDCHs). For example, the RNC may configure an enhanced transport format combination set ETFCS, which may be used by the UE and the Node-B in the uplink direction. The ETFCS may include a plurality of enhanced transport format combinations ETFCs, which may be used for communication between a UE and a Node-B. An ETFC is a selected combination of currently valid enhanced transport formats ETFs, which may be used for transmitting data over an EDCH. An enhanced transport format ETF specifies a data rate to be used for a subsequent transmission over a data portion of the EDCH.

UMTS Radio Access Networks RANs (e.g., Node-B's, RNCs, etc.) use two scheduling methods for transmission over enhanced dedicated channels (EDCH); Node-B scheduling (e.g., MAC-e signaling transmission scheduling), and non-scheduled transmission.

A Node-B scheduler allocates a specific (e.g., a maximum) amount of uplink resources, that a UE may use in the uplink direction, for example, based on Quality of Service related information (e.g., logical channel priority for each logical channel) and scheduling information (e.g., UE buffer capacity, a rate request bit setting, etc.) from the UE. This amount may be sent in a resource indication (or scheduling grant). This indication equates to a traffic-to-pilot ratio, or more specifically, in UMTS to the power ratio between E-DPDCH (the E-DCH dedicated physical data channel) and DPCCH (the dedicated physical control channel, which is always active in uplink).

UMTS-RANs include two types of scheduling grants, an enhanced absolute grant and an enhanced relative grant. An absolute grant is sent to the UE on the enhanced absolute grant channel (EAGCH) providing, for example, the scheduling grant for the UE to be used in future transmissions. The UE may then use this scheduling for transmitting data in the uplink direction by selecting an ETFC, which may consume less resource than given by the scheduling grant. The mapping between scheduling grant and ETFC is provided by the RNC to UE and Node-B.

A relative grant (or update) is sent to the UE on the Enhanced Relative Grant Channel (ERGCH) and serves as a complement to the absolute grant. A relative grant may adjust (e.g., increase or decrease) the scheduling grant, and hence the selected enhanced transport format combination (ETFC) provided in an absolute grant, and may have one of three values, "Up", "Down", and "Hold". A relative grant may be generated by the Node-B, for example, in response to an "Up" rate request bit received from the UE over an enhanced dedicated physical control channel (EDPCCH). A rate request bit (e.g., a happy bit (HP)), which may indicate whether the UE is satisfied with the current parameters (e.g., the maximum ETFC) provided by a previous absolute grant or relative grant.

If the UE has power available to transmit data at a higher ETFC and the total amount of data in the transmit buffer would require a greater number of Transmission Time Intervals (TTIs) than currently allotted (e.g., via the previous scheduling grant), the UE may transmit an "Up" rate request bit. The Node-B may then transmit a relative grant "Up" over the ERGCH to the UE in response to the received "Up" rate request bit. The relative grant "Up" allows the UE to increase the scheduling grant by a specific amount so that the UE is now allowed to select the next higher ETFC value in the ETFCS.

On the other hand if the Node-B detects the need to reduce the scheduling grant given for a specific UE, it may send a relative grant "Down" over the ERGCH to the UE. The relative grant "Down" will instruct the UE to reduce its scheduling grant by a specific amount, so that the UE is only allowed to select ETFC up to the next lower ETFC value in the ETFCS.

To evaluate the appropriate scheduling grants, the EDCH scheduler at the Node-B uses timely information about the consumed resources for each UE under its control, and sends the scheduling grants timely to the UEs in order for the grants to apply to the correct hybrid ARQ (HARQ) process (e.g., the process of sub-packet transmission well-known in the art). However, unlike HSDPA the users on EDCH are allowed to send asynchronously and hence the arrival of data for a specific HARQ process may be spread over an entire UMTS frame, which is equivalent to 10 msec. FIG. 2 illustrates the problem, which is discussed in more detail below.

According to the 3GPP UMTS standard the transmissions scheduling grants (e.g., relative and absolute grants), acknowledgement (ACK) and non-acknowledgement (NACK) messages start at the beginning of a subframe of 2 msec length, which is time-aligned to the downlink system frame of 10 msec length. As indicated before, time-arrivals of the received data on E-DCH are spread over the duration of one UMTS frame. After some time an ACK or a NACK needs to be sent to the UE in order to trigger the corresponding action for the next transmission on this specific HARQ process. The action may be a retransmission of the same data in case of a NACK or a transmission of new data in case of an ACK. The starting point for the transmission of the control information is well-defined in the standards, giving the Node-B sufficient time $T_{response}$ for generating the response, accordingly. In the example of FIG. 2, the Node-B must generate an ACK/NACK for UE#1 at the start of the second subframe, and an ACK/NACK for UE#2 at the start of the 5$^{th}$ subframe, giving times $T_{response1}$ and $T_{response2}$, respectively. If the scheduler wants to send a relative grant (RG), which is based on the received data information for that specific HARQ process, the scheduler needs to be ready at the same time. On the other hand, the scheduler needs to collect the received data information from all users that have sent E-DCH data within one transmission time interval (TTI), because it needs the information of the sum of all users in order to make a correct decision.

Accordingly, there is now the dilemma that on the one hand the scheduler should respond as fast as possible to the received data in order to align the RG to the specific HARQ process but on the other hand the scheduler needs to collect the data for all users in order to get the limit of the total allocated E-DCH resources.

SUMMARY OF THE INVENTION

The present invention relates to scheduling uplink resource for UE uplink transmission.

In one embodiment, a timing for collection of metrics regarding resource consumption is decoupled from a timing for generating scheduling grants. For example, at least one uplink resource allocation metric is generated based on uplink resource consumed by users over a time interval of a first length. An uplink resource grant for at least one user is generated based on the resource allocation metric such that the resource grant is generated within a time interval of a second length after an uplink resource consumption by the user, the second length being less than the first length.

In another embodiment, a target scheduling grant for a user is generated based on the uplink resource consumed by a plurality of users, and a scheduling grant for a user is generated based on the target scheduling grant and the uplink resource consumed by the user. More specifically, in one embodiment, a scheduling grant is generated for the user based on the target scheduling grant, the uplink resource consumed by the user, and a reference scheduling grant.

For example, the scheduling grant may be generated based on a first relationship between the uplink resource consumed by the user and the reference scheduling grant and a second relationship between the target scheduling grant and the reference scheduling grant. As another example, the scheduling grant may be generated according to different rules depending on whether the uplink resource consumed by the user is greater than, less than, or equal to the reference scheduling grant.

Embodiments of the present invention may also include generating the reference scheduling grant. For example, the reference scheduling grant may be generated based on uplink resource consumptions by the user. As another example, the reference scheduling grant may be generated based on the generated scheduling grant from a previous time interval.

In a still further embodiment, the target scheduling grant may be generated periodically according to a period having a first length of time, and the scheduling grant may be generated within second length of time after consumption of uplink resource by the user; wherein the second length of time is less than the first length of time.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE EMBODIMENTS

Figure 3:
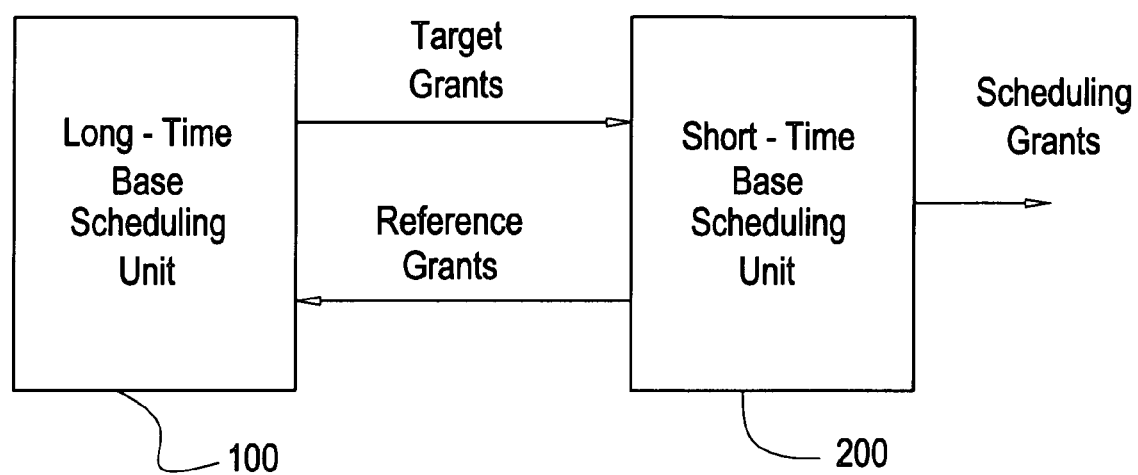
FIG. 3 illustrates a Node-B scheduler according to an embodiment of the present invention.

FIG. 3 illustrates a Node-B scheduler according to an embodiment of the present invention. As shown, the Node-B scheduler includes a long-time base scheduling unit 100 and a short-time base scheduling unit 200.

The long-time base scheduling unit 100 employs any well-known scheduling methodology using data collected over a relatively long time interval to generate scheduling grants. However, these scheduling grants are not sent to the UEs, and instead, are supplied as target grants to the short-time base scheduling unit 200. The short-time base scheduling unit 200 determines reference grants from the target grants, and performs a scheduling operation over a short time interval based on the target grants and reference grants. Furthermore, the reference grants may be used by the long-time base scheduling unit 100 in the generation of the target grants.

The operations performed by the long-time base scheduling unit 100 will now be described in detail. This will be followed by a detailed description of the operations performed by the short-time base scheduling unit 200.

I. Long-Time Base Scheduling Unit

As alluded to above, the scheduling operation performed by the long-time base scheduling unit 100 will be performed according to a relatively long time-base such as a scheduling interval, which may be for example one HARQ Round-Trip Time (RTT). For a TTI=10 msec the RTT is equivalent to 40 msec. Namely, the long-time base scheduling unit 100 collects the data from the previous scheduling interval. These are mainly the following inputs:

Reference grants, which are provided by the short-time base scheduling unit 200

EDCH resource consumption, which is derived from Node-B internal measurements and the reference grants User traffic data, e.g. derived from scheduling information or other input Other input, like average data rates, etc.

The long-time base scheduling unit 100 generates scheduling decisions, which are based, for example, on the above collected data and additional inputs such as:

User demand

Available resources,

Scheduling metric, e.g. proportional fair

The long-time base scheduling unit 100 issues these scheduling decisions as target scheduling grants for use by the short-time base scheduling unit 200.

As stated above, any-well known scheduling methodology for generating scheduling grants may be performed by the long-time base scheduling unit 100. However, for the purposes of providing a comprehensive disclosure, an example scheduling method will be described.

First, an embodiment of a relative rate scheduling method will be described. This will be followed by a description of an absolute rate scheduling method.

A. Relative Rate Scheduling

In relative rate scheduling, a UE sends a 1 bit rate request (RR) signal to a Node-B. The Node-B makes scheduling decisions based on, for example, target loading. While this embodiment will be described using the example of load as the uplink resource for basing scheduling decisions, it will be appreciated that other uplink resources such as rise-over-thermal (RoT) may be used for basing scheduling decisions.

The available loading that can be allocated to the EDCH is computed. Then, a hypothetical or estimated loading is computed assuming all EDCH rate requests are granted. If the estimated loading exceeds the available loading, EDCH TFI is reduced starting from the lower priority user until the loading condition is met. Once the loading condition is met, rate requests for the remaining higher priority users are granted. This scheduling method will now be described in greater detail below.

1. Rate Request: The rate request may be determined from a UE's buffer status and power limits. Required rate $R_k^{UE}$ may be determined from:

$$R_k^{UE} = \min[R_k^{max\_power}, \arg\max\{R|Q \geq R \times T_{SP}\}] \quad (1)$$

where $R_k^{max\_power}$ is the maximum TFI that is allowed based on UE power limit, Q is buffer depth, and $T_{SP}$ is the scheduling period. The UE sends a rate request signal RR having one of 3 states [STEP_UP, STEP_DOWN, NO_CHANGE], indicating rate increase, decrease, or no change relative to the current TFI (indicative of the current transmission rate) for the UE. Power limit TFI selection is specified in *Feasibility study for enhanced uplink for UTRA FDD*, 3GPP TR 25.896 Version 6.0.0, Third Generation Partnership Project, April 2004. At Node-B j, the requested rate for user or UE k at time n may be determined as:

$$R_{jk}^{Req}(n) = \begin{cases} R_{jk}(n-1)+1 & \text{if } RR = \text{'STEP\_UP' and } R_{jk} < R^{max} \\ R_{jk}(n-1)+1 & \text{if } RR = \text{'STEP\_DOWN' and } R_{jk} > R^{min} \\ R_{jk}(n-1) & \text{otherwise} \end{cases} \quad (2)$$

2. Priority Function: At the Node-B, UEs are ordered according to a priority function, starting from the highest priority user. In a proportional fairness scheduler, the priority function may be computed as according to the following expression:

$$P_{jk}(n) = \frac{R_{jk}^{Req}(n)}{\overline{R}_{jk}(n)} \quad (3)$$

where $\overline{R}_{jk}(n)$ is the average allocated rate of user k. The average allocated rate is computed as:

$$\overline{R}_{jk}(n) = \left(1 - \frac{1}{T_c}\right)\overline{R}_{jk}(n-1) + \left(\frac{1}{T_c}\right)R_{jk} \quad (4)$$

where $T_c$ is a time constant.

3. Calculate target loading: The maximum loading allowed in a cell may be set such that the rise-over-thermal (RoT) overshoot probability is limited to a certain value. Any well-known overshoot control algorithm may be used to determine a target RoT. The maximum loading may be calculated from RoT target using the relation:

$$\eta^{Max} = 1 - \frac{1}{RoT_{Target}} \quad (5)$$

4. Calculate current loading: The current uplink loading may be calculated every scheduling period from the well-known receive signal strength indicator (RSSI) according to the following expression:

$$\eta = 1 - \frac{P_{th}}{RSSI} \quad (6)$$

where the RSSI is computed every scheduling period as the slot-rate RSSI averaged over a period of the scheduling interval, and $P_{th}$ is the well-known, measurable quantity, thermal noise power.

5. Calculate available loading: For a user k using rate $R_k$, the user's contribution to the loading of cell j may be computed as:

$$\eta_{jk}(R_k) = \frac{SIR_{jk}(R_k)}{1 + SIR_{jk}(R_k)} \quad (7)$$

where $SIR_{jk}(R_k)$ is the signal-to-noise ratio (SIR) of the EDCH channel for UE k when rate $R_k$ is used. The $SIR_{jk}(R_k)$ may be computed as:

$$SIR_{jk}(R_k) = (E_c/I_0)_{jk}[1 + (\beta_e/\beta_c)^2 \times N_{multicode}]. \quad (8)$$

where Ec/Io is the received energy per chip to total received power and $N_{multicode}$ is the number of multicodes used. The ratio $(\beta_e/\beta_c)^2$ is, generally, the transmit power ratio for EDCH (e.g., the traffic-to-pilot ratio), which is estimated at the Node-B in any well-known manner. The estimated transmit power ratio may also be referred to as the estimated resource consumed or the estimated grant usage. However, in an embodiment of the present invention, instead of using the estimated grant usage of the kth UE in equation (8), the long-time base scheduling unit 100 instead uses the reference grant for the kth UE received from the short-time base scheduling unit 200. The generation of these reference grants will be described in detail below.

The available loading is calculated by calculating the loading due to other cell interference and dedicated channels (DCH), which are well-known channels set forth in UMTS. For example, DCH channels are used to carry uplink voice communication or low-latency constant rate data traffic. The loading from DCH users and other-cell interference $I_{oc}$ may be computed by:

$$\eta_j^{I_{DCH}+1} = \eta - \sum_{k, serving} \eta_{jk}(R_k). \quad (9)$$

The summation is over all the users that have cell j as their serving cell. Available loading for new EDCH transmission may then be calculated as:

$$\eta_j^{available} = \eta^{Max} - \eta_j^{I_{DCH}+1} - \sum_{k, Retx} \frac{SIR_{jk}(R_k)}{1 + SIR_{jk}(R_k)} \quad (10)$$

The last summation is for all on-going HARQ retransmissions of EDCH users.

6. Overload control If $\eta_j^{available} < 0$, the scheduler cannot allocate resource to any new EDCH transmission. As a result, the schedule steps down all users (UEs) rates as follows:

$$RG_{jk}(n) = \begin{cases} \text{'STEP\_DOWN'} & \text{if } R_{jk}(n-1) > R^{min} \\ \text{'NO\_CHANGE'} & \text{otherwise} \end{cases} \quad (11)$$

Here, RG stands for relative rate grant.

7. Calculate hypothetical (or, estimated) loading assuming all users rate requests are granted. If $\eta_j^{available} \geq 0$, then, the scheduler calculates the hypothetical or estimated loading if all rate requests are granted according to the following:

$$n_j^{hyp} = \sum_k \eta_{jk}(R_k^{Req}) \quad (12)$$

8. Grant all users rate requests if estimated load is less than or equal to the available load. If $n_j^{hyp} \leq n_j^{available}$, the scheduler grants all users' rate requests. Namely, each rate request is established as the respective target grant.

Figure 4:
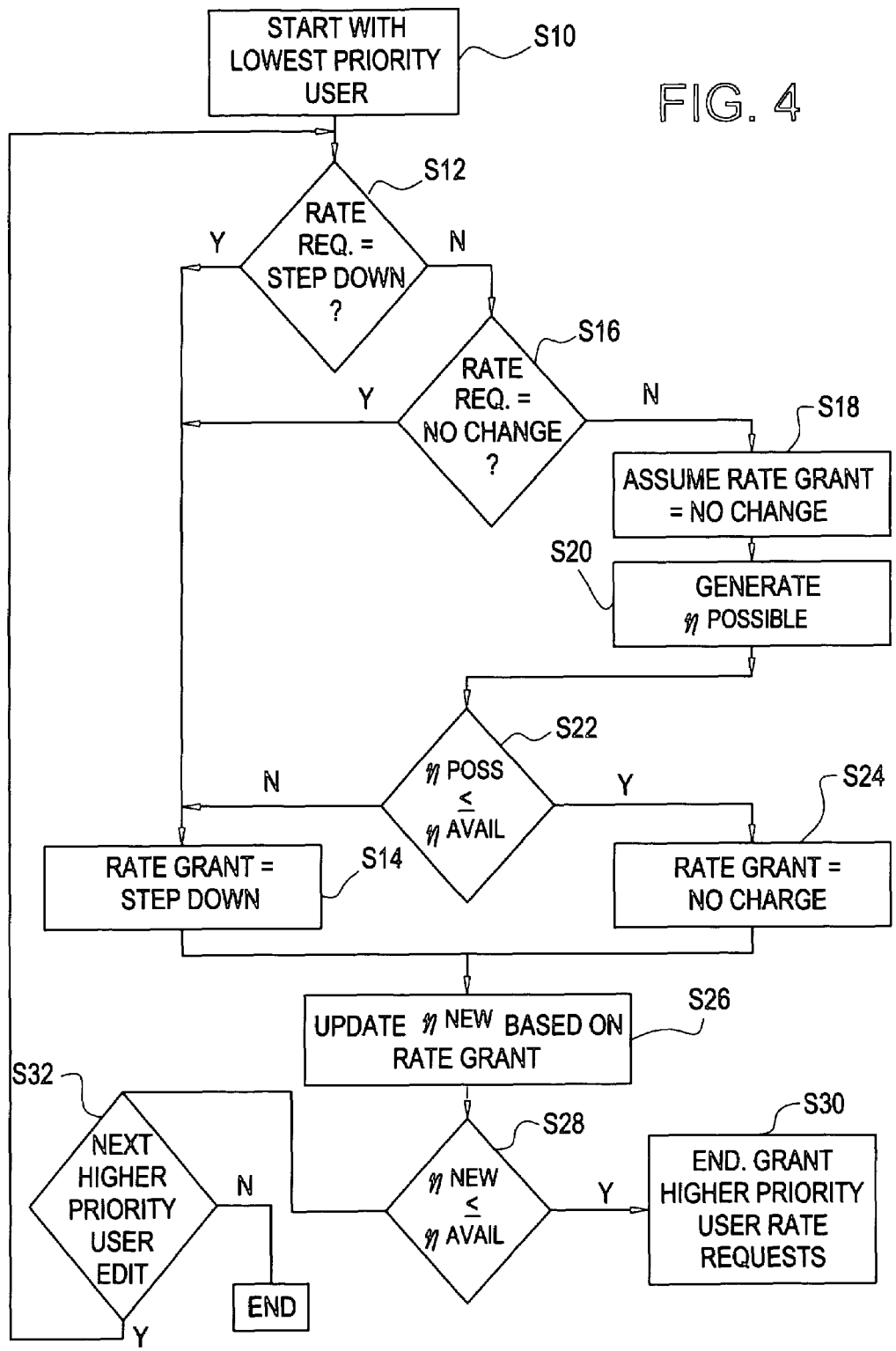
FIG. 4 illustrates a flow chart of a rate reduction process according to an embodiment of the present invention.

9. Determine granted rates in reverse priority order if estimated load is greater than the available load. If $\eta_j^{hyp} > n_j^{available}$, the scheduler begins selectively reducing the rates of the users starting from the lowest priority user. After each rate reduction, the scheduler updates the estimated load in light of the rate reduction. When the estimated load becomes less than or equal to the available load, the scheduler discontinues the rate reduction process and grants the requested rates of the remaining higher priority users. Namely, these granted requested rates are established as the target grants. This rate reduction process will now be described in detail with reference to the flow chart illustrated in FIG. 4.

As shown, in step S10, processing starts with the lowest priority user. Then, in step S12, the scheduler determines if the rate request for this user is a step down request. If so, the rate request is granted in step S14, and processing proceeds to step S26.

If, in step S12, the scheduler determines that the rate request is not a step down, then in step S16, the scheduler determines if the rate request is a no change request. If so, then processing proceeds to step S14 where the scheduler assigns a rate grant of step down. Namely, if the UE requests to transmit at the same rate as the previous transmission, the scheduler decreases the transmission rate. Processing then proceeds to step S26.

If, in step S16, the scheduler determines that the rate request is not a no change request, then the rate request is a step up request. In step S18, the scheduler treats the rate request as a no change request, and in step S20 determines a new possible estimated load assuming the rate request is a no change request. Subsequently, in step S22, the scheduler determines if the new possible estimated load is less than or equal to the available load. If so, then the scheduler assigns a rate grant of no change. Namely, if the UE requests to transmit at higher rate than the previous transmission, the scheduler assigns the same transmission rate as the previous transmission. Processing then proceeds to step S26. However, if in step S22, the scheduler determines that the new possible estimated load is greater than the available load, then processing proceeds to step S14 where the scheduler assigns a rate grant of step down. Processing then proceeds to step S26.

In step S26, the scheduler updates the estimated load based on the rate granted to the UE under consideration. The scheduler then determines if the updated, estimated load is less than or equal to the available load in step S28. If so, then the scheduler grants the rate requests of all high priority users and processing ends. However, if the estimated load is still greater than the available load in step S28, then in step S32, the scheduler determines if a next higher priority user exists or not. If not, then processing ends. If a next higher priority user exists, then processing returns to step S12 for the next higher priority user.

In the context of the present invention the target grant may be estimated from the rate grants by firstly setting the target grant equal to the reference grant and afterwards according to the following rules:

If rate grant="down", then decrement target grant by a specific amount.

If rate grant="hold", then leave target grant as it is.

If rate grant="up", then increment target grant by a specific amount.

B. Absolute Rate Scheduling

In absolute rate scheduling, a UE sends scheduling information such as available power and queue size to the Node-B. The Node-B scheduler estimates the required maximum TFC for each UE. The scheduler then determines a maximum TFC allowed for each UE similar to the relative rate scheduling embodiment described above. This absolute rate scheduling methodology will be now described in more detail.

1. Calculate required rate: The Node-B determines a UE's required rate based on the UE's buffer status and power limits. For example, the required rate may be determined as in Eq. (1). In a special case, the required rate may be characterized as in equation (2). Namely, with respect to equation (2), if the Node-B determines a required rate that is greater than the previous transmission rate for the UE, the required rate is characterized as a step up request; if the Node-B determines the required rate is the same as the previous transmission rate for the UE, the required rate is characterized as a no change request; and if the Node-B determines the required rate is less than the previous transmission rate for the UE, the required rate is characterized as a step down request.

2. Calculate available loading and hypothetical (or estimated) loading. The available and estimated loading may be determined in the same manner as described above in steps 5 and 7 for relative rate scheduling.

3. Overload control If $n_j^{available} < 0$, the scheduler cannot allocate uplink resource to any new EDCH transmission. As a result, the schedule steps down all users (UEs) rates as follows:

$$RG_{jk}(n) = R^{min} \quad (13)$$

4. Grant all users rate requests. If $\eta_j^{hyp} \leq n_j^{available}$, the scheduler grants all users' rate requests. Namely, the granted rate requests are established as the respective target grants.

Figure 1:
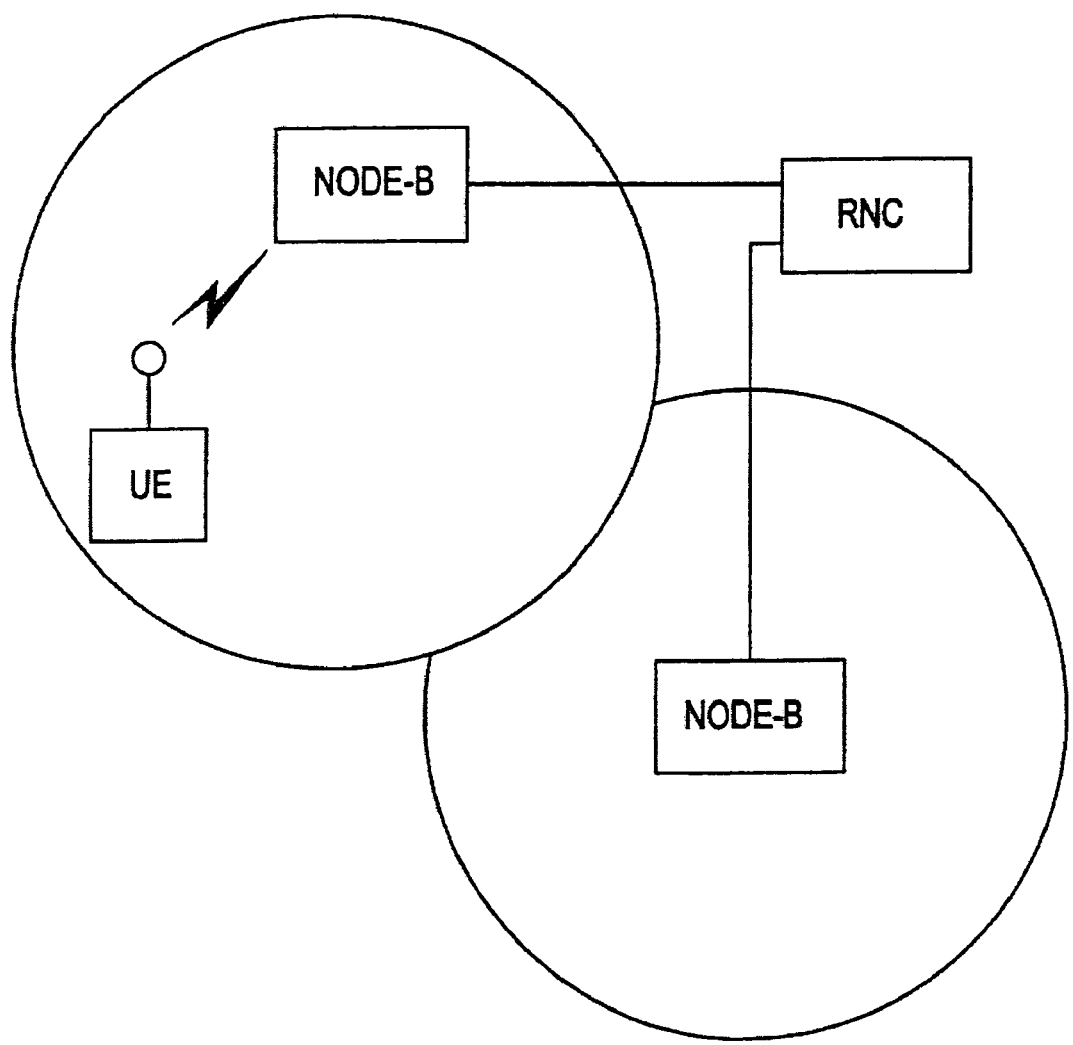
FIG. 1 illustrates a portion of a conventional UMTS wireless communication system.
Figure 2:
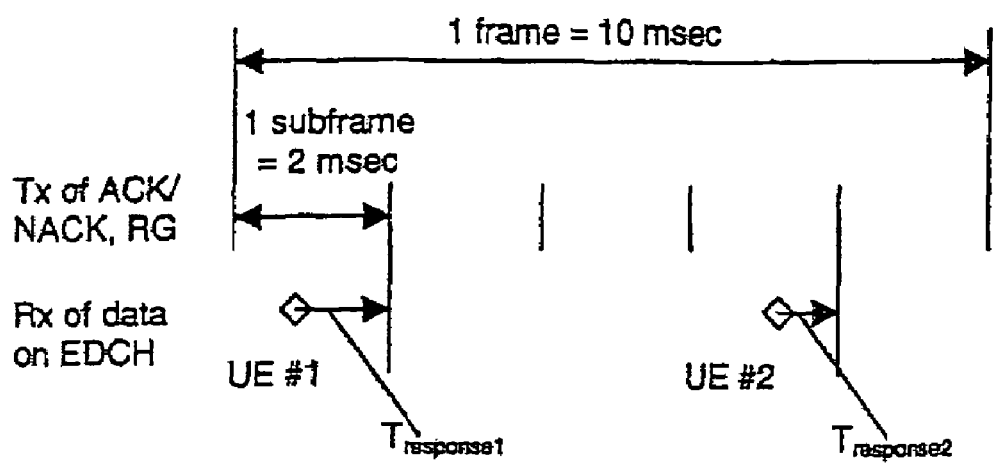
FIG. 2 graphically illustrates a dilemma with conventional scheduling in a UMTS wireless communication system.

5. Determine granted rates in reverse priority order. If $\eta_j^{hyp} > n_j^{available}$, the scheduler selectively reduces the rates for users starting from the lowest priority user. After each rate reduction, the scheduler updates the estimated load in light of the rate reduction. When the estimated load becomes less than or equal to the available load, the scheduler discontinues the rate reduction process and grants the requested rates of the remaining higher priority users. Again, it will be understood that these grants become the target grants. For example, based on the characterization of the rate requests in step 1, the scheduler may employ the rate reduction process of FIG. 2 described in detail above.

When reducing the requested rate in step S14, the scheduler can step down rates by a fixed decrement as in relative rate scheduling, or the scheduler may aggressively step down a user's rate all the way down to an autonomous set rate (e.g., a minimum set rate). It will also be appreciated that other methodologies for determining the amount to step down the transmission rate may be used without departing from the present invention.

In the context of the present invention the target grant may be determined directly from the granted data rates by applying the ETFC to scheduling grant mapping, which is provided by the RNC to the Node-B. The ETFC itself is simply given from the granted data rate.

II. Short-Time Base Scheduling Unit

The scheduling performed by the short-time base unit 200 is performed on a much shorter time-period of, for example, one subframe, which on EDCH is equivalent to 2 msec. As is known, the UEs are grouped to specific subframes, which are given by their associated down link control channels. The short-time base scheduling unit 200 generates scheduling grants and also generates reference grants. First the generation of the relative grants will be described, and then the generation of the reference grants will be described.

A. Generation of Relative Grants

As described in greater detail below, the generation of relative grants for a UE depends on the reference grant associated with the UE. The methodology of establishing the reference grants will be described in greater detail below. However, it will be helpful to understand that initially, the reference grant for a UE may be established as the target grant; and thereafter, may be established as described in greater detail below.

The short-time base scheduling unit 200 estimates, in the well-known manner, the resource consumed by a UE. As discussed above, this is an estimate of the traffic-to-pilot ratio (TPR), or more specifically, in UMTS the power ratio between E-DPDCH (the E-DCH dedicated physical data channel) and DPCCH (the dedicated physical control channel, which is always active in uplink). As further discussed above, this estimate may be referred to as the estimated grant usage. Based on the consumed resource, the short-time base scheduling unit 100 generates relative grants as follows for each UE:

If for a specific HARQ process of a UE, data has been received and has consumed E-DCH resources equivalent to the reference grant (e.g., estimated grant usage=reference grant), then send the relative grant (RG) for this process as follows:

If Target Grant>Reference Grant, then set RG=UP
If Target Grant==Reference Grant, then set RG=HOLD
If Target Grant<Reference Grant, then set RG=DOWN Else, if data has been received from a UE with resource consumption higher than the reference grant (e.g., estimated grant usage>reference grant), then send the RG for this process as follows:

If Target Grant>Reference Grant, then set RG=HOLD
If Target Grant<=Reference Grant, then set RG=DOWN This is usually the case if the reference grant from the previous scheduling period has been estimated lower than the scheduling grant, which was valid for the specific UE (e.g. due to low traffic activity during that time).

Otherwise, if data has been received with resource consumption lower than the reference grant (e.g., estimate grant usage<reference grant), then do not apply any RG. This is usually the case if, for example, due to lower traffic activity the UE sends data with a scheduling grant lower than the reference grant.

It will be understood that the relative grants are applied to the correct HARQ process by the short-time base scheduling unit 200; namely, at the beginning of a subframe. Accordingly, scheduling of the relative grants takes places according to a much short time interval than the generation of the target grants or the generation of the relative grants discussed below. Furthermore, it will be appreciated that while this process does not change from scheduling interval to scheduling interval, the target and reference grants may change from scheduling interval to scheduling interval.

While described for relative grant scheduling, operation of the short-time base scheduling unit 200 may be extended to absolute scheduling grants. The absolute scheduling operation is as follows:

If the UE, which was inactive before, has sent scheduling information indicating a demand for data transmission, the scheduler will include this UE in the scheduling process and allocate a target grant based on the request and the available data; for example, by using the absolute rate scheduling method as mentioned before for that user. Namely, the target grant will be transmitted as an absolute grant within the next available TTI after scheduling. After this first activation, the UE will be scheduled as described above for relative grants.

If inactivity has been detected for a UE, which was active before, the scheduler will take this UE off the scheduling list and generate a target grant of "ZERO". This target grant is also sent as an absolute grant within the next TTI available after scheduling. After this deactivation, the UE can not be scheduled, and will need to be activated as described above.

B. Generation of Reference Grants

For the active UEs, the reference grants are collected and sent to the long-time base scheduling unit 100 for use in the generation of the target grants for the next scheduling interval. The reference grant for each UE is generated as follows:

If no update of the scheduling grant has been requested by the UE for this scheduling period, then set the reference grant according to some specific function. For example, the maximum estimated grant usage (e.g., maximum resource consumed) for the UE during this period may be set as the reference grant, or simply the old reference grant from the previous scheduling period may be set as the reference grant.

If an update of the target scheduling grant has been requested for this scheduling period, the following rules are used to generate the reference grant:

If a RG has been generated by the short-time base unit 200, then the reference grant shall be equal to the new scheduling grant after application of the RG.

If no RG has been generated by the short-time base unit 200, then the reference grant is taken according to some function. For example, the maximum estimated grant usage (e.g., maximum resource consumed) for the UE during this period may be set as the reference grant, or simply the old reference grant may be set as the reference grant from the previous scheduling period.

As stated above, the target and reference grants are expressed by their traffic to pilot ratio (TPR) or the related index in the TPR table, which is given by the UMTS standard, respectively. Because relative grants are only effective on active data transmissions the target scheduling grant must be limited to a minimum, which ensures the transmission of data with minimum transport block size.

The method and apparatus according to the present invention resolves the problem of time-aligned transmission of the scheduling grant on the one hand and collection of the data for all users on the other hand. By de-coupling the two scheduling stages, the method may be applied, for example, to solve misalignment in timings.

The invention being thus described, it will be obvious that the same may be varied in many ways. For example, while the embodiments described above concerned the EDCH in a UMTS wireless communication system, the present invention is not limited in application to this channel or a UMTS system. Such variations are not to be regarded as a departure from the invention, and all such modifications are intended to be included within the scope of the invention.

We claim:

1. A method of scheduling uplink resource, comprising:
generating, by a first scheduler, a target scheduling grant for a user over a first time interval, the target scheduling grant based on the uplink resource consumed by a plurality of users;
generating, by a second scheduler, a scheduling grant for a user over a second time interval, the scheduling grant based on the target scheduling grant and the uplink resource consumed by the user, the first and the second schedulers being node-level schedulers, and the first time interval and the second time interval not being equal to each other.

2. The method of claim 1, wherein the generating a scheduling grant step generates the scheduling grant for the user based on the target scheduling grant, the uplink resource consumed by the user, and a reference scheduling grant.

3. The method of claim 2, wherein the generating a scheduling grant step generates the scheduling grant based on a first relationship between the uplink resource consumed by the user and the reference scheduling grant and a second relationship between the target scheduling grant and the reference scheduling grant.

4. The method of claim 2, wherein the generating a scheduling grant step generates the scheduling grant according to different rules depending on whether the uplink resource consumed by the user is greater than, less than, or equal to the reference scheduling grant.

5. The method of claim 2, wherein if the uplink resource consumed by the user equals the reference scheduling grant, the generating a scheduling grant step,
generates an up relative grant if the target scheduling grant is greater than the reference scheduling grant;
generates a hold relative grant if the target scheduling grant is equal to the reference scheduling grant; and
generates a down relative grant if the target scheduling grant is less than the reference scheduling grant.

6. The method of claim 2, wherein if the uplink resource consumed by the user is greater than the reference scheduling grant, the generating a scheduling grant step,
generates a hold relative grant if the target scheduling grant is greater than the reference scheduling grant; and
generates a down relative grant if the target scheduling grant is less than or equal to the reference scheduling grant.

7. The method of claim 2, wherein if the uplink resource consumed by the user is less than the reference scheduling grant, the generating a scheduling grant step does not generate a scheduling grant.

8. The method of claim 2, wherein
if the uplink resource consumed by the user equals the reference scheduling grant, the generating a scheduling grant step generates an up relative grant if the target scheduling grant is greater than the reference scheduling grant, generates a hold relative grant if the target scheduling grant is equal to the reference scheduling grant, and generates a down relative grant if the target scheduling grant is less than the reference scheduling grant;
if the uplink resource consumed by the user is greater than the reference scheduling grant, the generating a scheduling grant step generates a hold relative grant if the target scheduling grant is greater than the reference scheduling grant, and generates a down relative grant if the target scheduling grant is less than or equal to the reference scheduling grant; and
if the uplink resource consumed by the user is less than the reference scheduling grant, the generating a scheduling grant step does not generate a scheduling grant.

9. The method of claim 2, further comprising:
generating the reference scheduling grant.

10. The method of claim 9, wherein the generating a reference scheduling grant step generates the reference scheduling grant based on uplink resource consumptions by the user.

11. The method of claim 10, wherein the generating a reference scheduling grant step generates the reference scheduling grant as a maximum one the uplink resource consumptions by the user over a period of time.

12. The method of claim 9, wherein the generating a reference scheduling grant step generates the reference scheduling grant as the generated scheduling grant from a previous time interval.

13. The method of claim 9, wherein
the generating a reference scheduling grant step generates the reference scheduling grant based on uplink resource consumptions by the user if the user has not requested an update of the scheduling grant; and
the generating a reference scheduling grant step generates the reference scheduling grant as the generated scheduling grant from a previous time interval if the user has requested an update of the scheduling grant.

14. The method of claim 9, wherein
the generating a target scheduling grant step generates the target scheduling grant periodically according to a period having a first length of time;
the generating a reference scheduling grant step generates the reference scheduling grant periodically according to the first period; and
the generating the scheduling grant step generates the scheduling grant within second length of time after consumption of uplink resource by the user, the second length of time being less than the first length of time.

15. The method of claim 14, wherein the first length of time is 40 ms and the second length of time is 2 ms.

16. The method of claim 14, wherein the first length of time is at least one order of magnitude greater than the second period of time.

17. The method of claim 2, wherein the generating a target scheduling grant generates the target scheduling grant using reference scheduling grants for the plurality of users as the uplink resource consumed by the plurality of users.

18. The method of claim 1, wherein
the generating a target scheduling grant step generates the target scheduling grant periodically according to a period having a first length of time; and
the generating the scheduling grant step generates the scheduling grant within second length of time after consumption of uplink resource by the user, the second length of time being less than the first length of time.

19. A method of scheduling uplink resource, comprising:
generating a target scheduling grant, by a first node level scheduler, based on uplink resource consumed by users over a first time interval; and
generating an uplink resource grant for at least one user based on the target scheduling grant, by a second node level scheduler, such that the resource grant is generated within a second time interval after the first time interval, the second time interval being shorter than the first time interval.

* * * * *

UNITED STATES PATENT AND TRADEMARK OFFICE
CERTIFICATE OF CORRECTION

PATENT NO. : 7,660,279 B2  Page 1 of 1
APPLICATION NO. : 11/340613
DATED : February 9, 2010
INVENTOR(S) : Brueck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 786 days.

Signed and Sealed this

Twenty-eighth Day of December, 2010

David J. Kappos
*Director of the United States Patent and Trademark Office*